United States Patent
Calame (10) Patent No.: US 11,520,290 B2
(45) Date of Patent: Dec. 6, 2022

(54) WHEEL FOR HOROLOGY MOVEMENT

(71) Applicant: ROLEX SA, Geneva (CH)

(72) Inventor: Florian Calame, Epalinges (CH)

(73) Assignee: ROLEX SA, Geneva (CH)

( * ) Notice: Subject to any disclaimer, the term of this patent is extended or adjusted under 35 U.S.C. 154(b) by 783 days.

(21) Appl. No.: 16/361,624

(22) Filed: Mar. 22, 2019

(65) Prior Publication Data

US 2019/0302696 A1 Oct. 3, 2019

(30) Foreign Application Priority Data

Mar. 29, 2018 (EP) .................................... 18165006

(51) Int. Cl.
*G04B 15/14* (2006.01)
*F16N 1/00* (2006.01)

(52) U.S. Cl.
CPC ............. *G04B 15/14* (2013.01); *F16N 1/00* (2013.01); *F16N 2210/12* (2013.01)

(58) Field of Classification Search
CPC ....................................................... G04B 15/14
See application file for complete search history.

(56) References Cited

U.S. PATENT DOCUMENTS

| 2,504,693 A * | 4/1950 | Jeanneret | G02B 6/4248 |
| | | | 368/124 |
| 9,958,830 B2 * | 5/2018 | Richard | G04B 15/14 |
| 2018/0373201 A1 * | 12/2018 | Tu | G04B 15/06 |

FOREIGN PATENT DOCUMENTS

| CH | 281799 A | | 3/1952 | |
| CH | 703781 A2 * | | 3/2012 | ............. G04B 13/02 |
| CN | 101952783 A * | | 1/2011 | ........... G04D 3/0069 |
| EP | 1 637 939 A1 | | 3/2006 | |
| EP | 1637938 A1 * | | 3/2006 | ............. G04B 15/14 |
| EP | 2107434 A1 * | | 10/2009 | ............. G04B 15/14 |
| EP | 2251746 A2 * | | 11/2010 | ............. C25D 11/02 |
| EP | 2 581 794 A1 | | 4/2013 | |
| EP | 3067757 A1 * | | 9/2016 | ............. G04B 31/08 |

OTHER PUBLICATIONS

European Search Report and Written Opinion dated Sep. 25, 2018 issued in counterpart application No. EP18165006; w/ English machine translation (16 pages).

* cited by examiner

*Primary Examiner* — Edwin A. Leon
*Assistant Examiner* — Kevin Andrew Johnston
(74) *Attorney, Agent, or Firm* — WHDA, LLP (57) ABSTRACT

Horology component intended to cooperate via a lubricated contact with at least one second horology component within a horology movement, said horology component comprising at least two distinct contact surfaces intended to cooperate with the same second horology component, characterized in that said two contact surfaces are offset with respect to one another, such that a first contact surface is adapted to displace a lubricant present on the second horology component towards a surface with which the second contact surface will subsequently come into contact.

18 Claims, 6 Drawing Sheets

WHEEL FOR HOROLOGY MOVEMENT

This application claims priority of European patent application No. EP18165006.0 filed Mar. 29, 2018, the content of which is hereby incorporated by reference herein in its entirety.

The present invention relates to a horology component, specifically a wheel for a horology movement, as well as all or part of a horology movement incorporating a suchlike component or a suchlike wheel, especially an escapement device comprising an escapement wheel. The invention also relates to a timepiece comprising a suchlike wheel for a horology movement. The invention also relates to a method of driving a horology movement based on a suchlike component or a suchlike wheel. The invention also relates to an assembly of at least two horology components cooperating with each other via a lubricated contact. Finally, the invention relates to a method of manufacturing a suchlike component or a suchlike wheel for a horology movement.

A horology movement comprises moving components, including horology components in contact with one another, for the mechanical transmission of a movement. These horology components in contact are subjected to friction, which leads to wear in the parts with the potential to compromise the precision of the horology movement.

In order to reduce this friction, it is customary to utilize a liquid lubricant on the friction zones of horology components, typically an oil. The oil utilized must be stable, and must remain optimally on the contact zone over time. In addition, it is necessary to reduce the risk of the oil being dispersed inside the horology movement.

By way of example, document CH281799 describes a solution for the lubrication of an escapement device, in which the teeth of the escapement wheel comprise a recessed face forming a shoulder which constitutes an oiler, in which the oil is retained by capillarity. A suchlike solution prevents the dispersion of the oil inside the horology movement and assists in the positioning of the oil in proximity to the contact zone.

The object of the invention is to improve the lubrication between horology components.

More specifically, one object of the invention is to improve the retention of a lubricant in a contact zone between two horology components.

For this purpose, the invention is based on a horology component, especially a wheel, intended to cooperate via a lubricated contact with at least one second horology component within a horology movement, said horology component comprising at least two distinct contact surfaces intended to cooperate with the same second horology component, characterized in that said two contact surfaces are offset with respect to one another, such that a first contact surface is adapted to displace a lubricant present on the second horology component towards a surface with which the second contact surface will subsequently come into contact.

This offset of the two distinct contact surfaces of the horology component is such that the two contact surfaces are able to cooperate with different contact zones, not totally overlapping, of a second horology component.

The invention also relates to an assembly of two horology components of a horology movement, comprising a first horology component cooperating via a lubricated contact with a second horology component, the first horology component comprising at least two distinct contact surfaces cooperating with the second horology component. The assembly is characterized in that said two contact surfaces are offset with respect to one another such as to offset their two respective contact zones on the second component. A first contact surface of the first horology component is adapted to displace a lubricant present on the second horology component from the first contact zone, with which said first contact surface comes into contact, towards the second contact zone, offset in relation to the first contact zone, with which said second contact surface comes into contact, said two contact zones being positioned on the same contact surface of the second component.

The invention defined more precisely by the claims.

These objects, characterizing features and advantages of the present invention are discussed in detail in the following description of individual embodiments, which are provided without limitation in relation to the accompanying figures, in which.

For reasons of simplicity, the same references will be used to designate similar characterizing features and/or components in the different embodiments of the invention.

In addition, taking into consideration all the contact surfaces of a horology component, which are distributed, for example, on different teeth in the case of a wheel or a rack, a plane in which the horology component is generally arranged is defined by convention as a horizontal plane. A suchlike horizontal plane is represented by the two axes X and Y. For example, in the case of a wheel, the horizontal plane is a plane perpendicular to the axis of rotation of the wheel: the teeth of the wheel are distributed in a suchlike plane, and their height h extends in a manner perpendicular to this plane, in a direction defined as vertical and indexed by a vector Z. In the case of a wheel, the vertical direction is therefore parallel to the axis of rotation of the wheel. A plane passing substantially at the average height of all the teeth may be defined more accurately as a median horizontal plane. In the case of a rack, the horizontal plane X-Y comprises the direction of displacement of the rack and a transverse direction in which all the rack extends. The vertical direction comprises the height h of the teeth, defined in a manner similar to that of the teeth of a wheel. In these two cases, the vertical direction Z is therefore defined as the direction perpendicular to the horizontal plane. In the case of a rack with contrate gear teeth, the direction Z is perpendicular to the direction of displacement of the rack.

Figure 1:
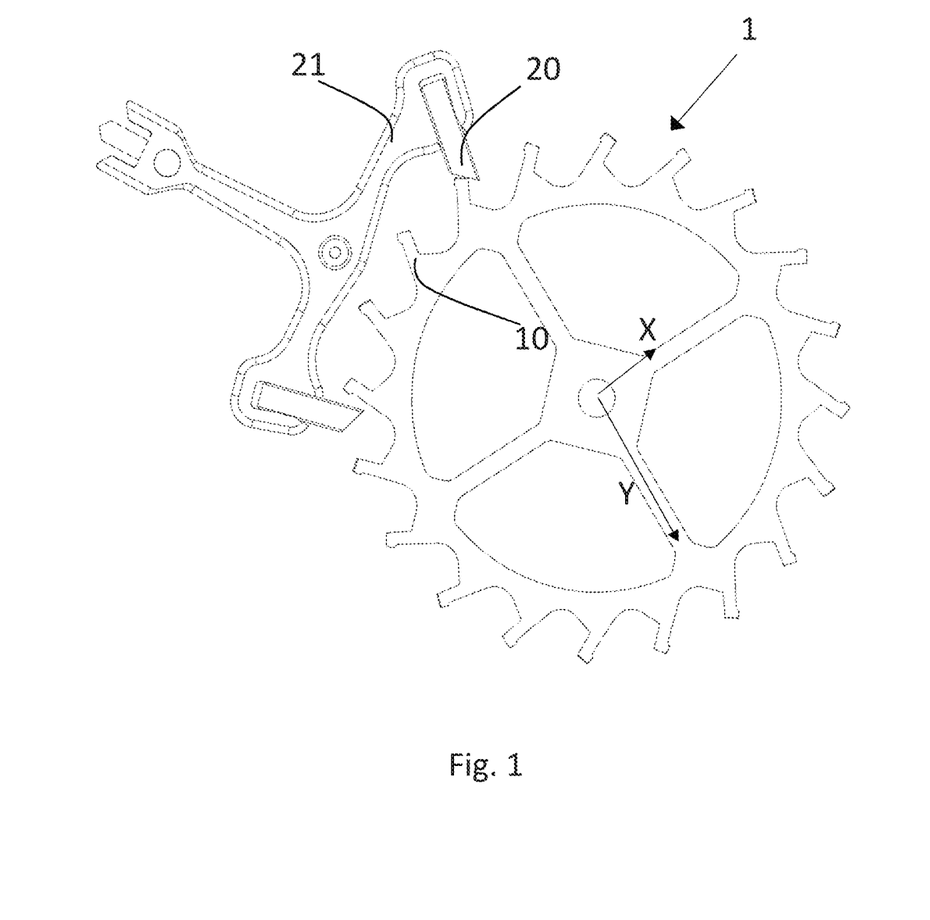
FIG. 1 depicts an escapement device for a horology movement according to an embodiment of the invention.

FIG. 1 depicts a Swiss lever escapement device according to an embodiment the invention. This escapement device comprises in a manner known per se an escapement wheel 1 comprising teeth 10 cooperating with pallets 20 arranged on an escapement lever 21. During their cooperation in a manner known per se, the teeth 10 of the escapement wheel cooperate by friction with the pallets 20. By way of example in FIG. 1, a tooth 10 cooperates with the exit pallet 20.

According to the embodiment, the escapement wheel differs from traditional solutions especially by the form of its teeth. It will be appreciated that a tooth 10 comprises on its extremity a plane, or substantially plane, contact surface 11, which extends in a vertical orthoradial plane, perpendicular to the radial direction. This surface rubs progressively on a pallet 20, according to its displacement in the horizontal plane in the orthoradial direction during rotation of the wheel. In the process, all the points of this contact surface 11 that are aligned in the vertical direction Z come into contact simultaneously, or substantially simultaneously, with the corresponding contact surface of the pallet 20, whereas the points of this contact surface 11 that are aligned in the orthoradial direction come into contact successively.

Figure 2:
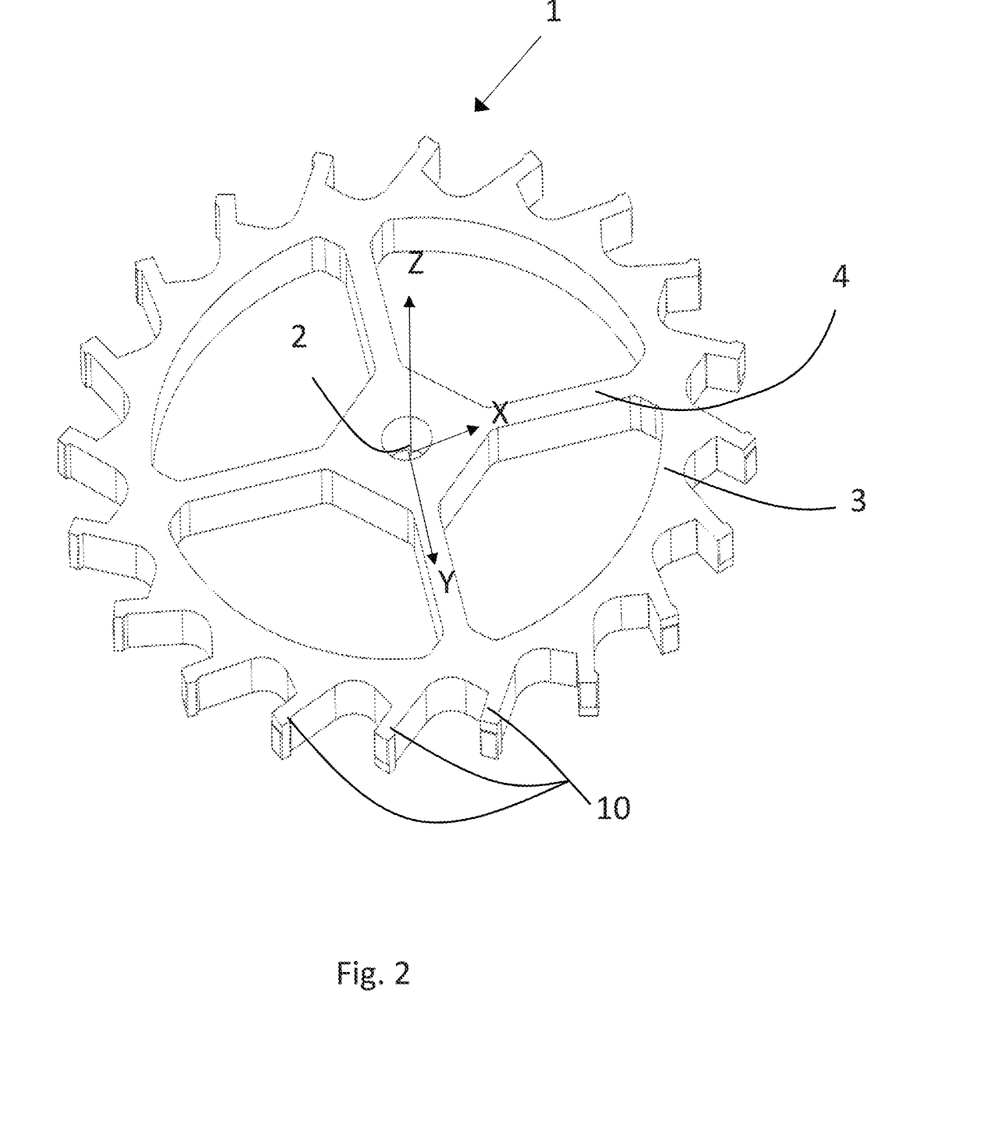
FIG. 2 depicts an escapement wheel of the escapement device according to a first embodiment of the invention.
Figure 3:
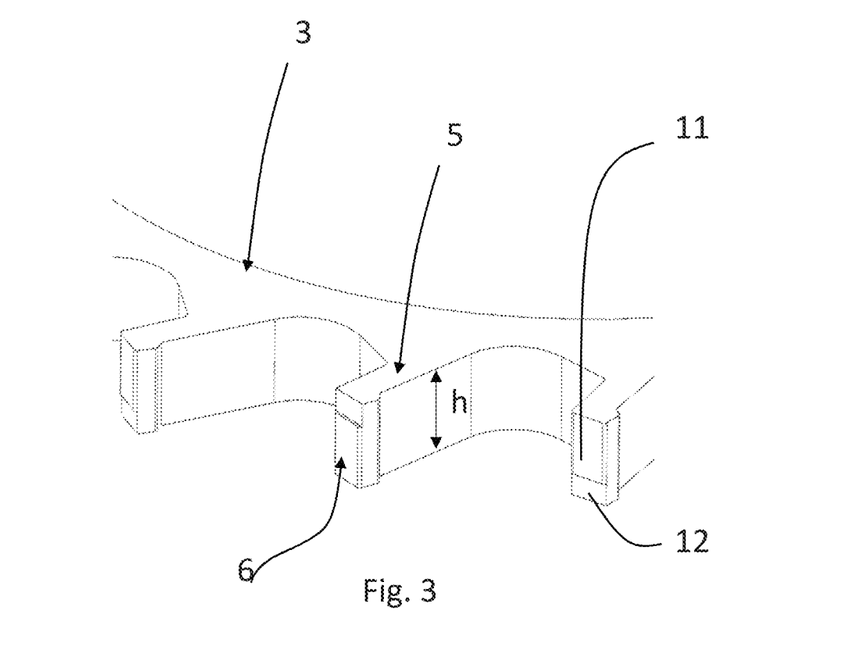
FIG. 3 depicts a plurality of consecutive teeth of the escapement wheel of the escapement device according to the first embodiment of the invention.

The escapement wheel 1, depicted in FIG. 2, is intended for installation on a vertical axis of rotation, positioned at its centre 2. It comprises a rim 3 arranged around the axis of rotation, retained by four radial arms 4. Teeth 10 extend from the outer periphery of the rim 3. As represented by FIG. 3, the teeth 10 comprise a base 5 carrying an outermost surface 6, on which there is arranged at least one contact surface 11, intended to interact by friction with at least one corresponding contact surface of the pallets. This friction is assisted by the use of a lubricant, for example selected from among the familiar lubricants.

Figure 4:
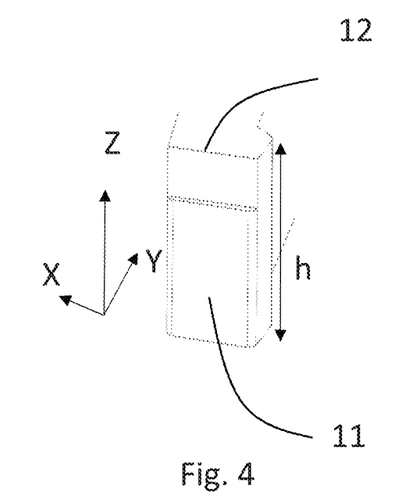
FIG. 4 depicts a tooth of the escapement wheel of the escapement device according to the first embodiment of the invention.

According to this embodiment, the outermost surface 6 arranged at the extremity of a tooth 10 comprises a cut-out zone in relation to the same surface which would be continuous on a tooth of an escapement device according to the prior art. This cut-out forms a plane recessed surface 12, which does not, at least, come into contact with the corresponding contact surface of the pallet. According to the embodiment in FIG. 2, the recessed surface 12, visible in FIGS. 3 and 4, extends for the entire width of the outermost surface 6 of the tooth, said width being measured according to the orthoradial direction. The rest of the outermost surface 6, which is not cut out, forms a contact surface 11 intended to cooperate by friction with the pallet 20. The recessed surface 12 is separated from the contact surface 11 by a perpendicular wall plane, positioned substantially in a horizontal plane. The height h of the extremity of the tooth 10, measured in the vertical direction Z, comprising the two contact surface 11 and recessed surface 12, is substantially the same as the height of the base 5 of the tooth 10, joining the outermost surface 6 to the rim 3. According to the embodiment in FIG. 4, the recessed surface 12 is substantially rectangular, parallel to the contact surface 11. The height of this contact surface 11 represents about two thirds of the total height h of the tooth, the recessed surface 12 occupying the highest one-third of this tooth 10, viewed in the vertical direction Z.

According to the embodiment, the escapement wheel 1 comprises an alternation of different teeth 10, which are distinguished by the positioning of their cut-out, that is to say the recessed surface 12. In the embodiment in FIG. 4, the recessed surface 12 is located on the upper extremity of the tooth 10, and extends from the top for about one third of its height, as mentioned above. As can be appreciated in FIG. 3, the escapement wheel comprises an alternation of teeth as described with reference to FIG. 3 with similar teeth, but of which the recessed surface 12 is positioned in the lower part of the tooth, extending for substantially one third of its height starting from the bottom. In other words, the contact surface 11 is offset in the vertical direction from a first tooth to its successive tooth, this offset corresponding to about one third of the height of the tooth. The expression "successive tooth" is used to denote the immediately successive tooth, that is to say the adjacent tooth which is the first to come into contact with the pallet after the first tooth concerned. Thus, in this embodiment, the wheel finally comprises two types of teeth, and each tooth of a first type is surrounded by two adjacent, preceding and successive teeth of the second type, thus forming an alternation of teeth of the first type and of the second type. The cut-outs of the teeth 10 are such that the recessed surfaces 12 are alternatively on the top and bottom extremities of an outermost surface 6 of a tooth 10. In other words, each recessed surface 12 and each contact surface 11 of the teeth are distributed alternatively symmetrically around a median horizontal plane of the wheel 1.

Figure 5A:
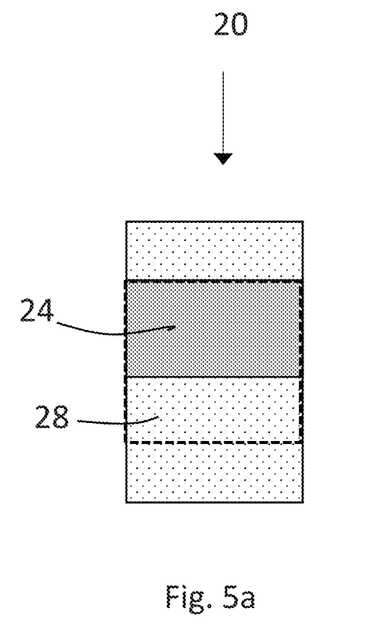
FIGS. 5a and 5b depict schematically the positioning of the lubricant on the contact surface of a pallet of a lever or a blocking member of the escapement device, after its cooperation respectively with a first tooth and then with a second tooth of the escapement wheel, according to the first embodiment of the invention.
Figure 5B:
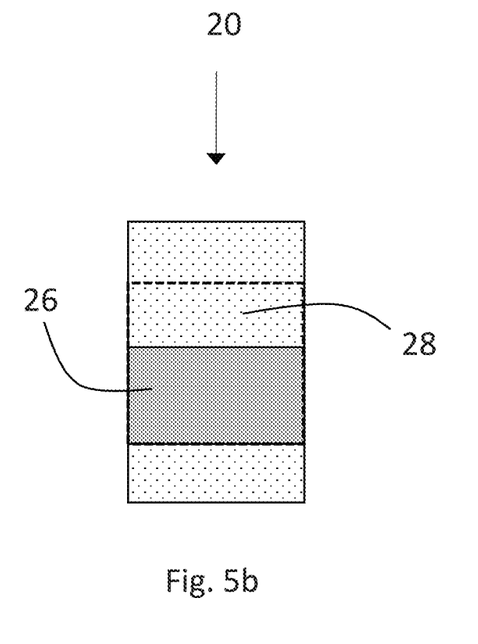

The technical effect produced by the escapement wheel according to the first embodiment described above is illustrated by FIGS. 5a and 5b. These FIGS. 5a, 5b illustrate the contact surface of the pallet 20, positioned facing the escapement wheel 1, which cooperates with the teeth of this escapement wheel. FIG. 5a in particular depicts the state of the pallet after the cooperation with a first tooth 10 of the escapement wheel, corresponding to a tooth of which the cut-out is in the lower part of its outermost surface 6. As a result, the contact is produced by the contact surface 11 of the tooth 10, in the top position of the tooth. The effect of this contact is to displace the lubricant positioned on the pallet 20 and, at the end of this cooperation, the pallet exhibits an upper zone 24 where there is a lack of lubricant, specifically on the zone having been subjected to friction with the contact surface 11 of the tooth 10. The lubricant is thus displaced onto the remaining surface of the pallet 20, especially in the lower part.

The successive tooth 10 of the escapement wheel comprises a different contact surface 11, positioned in the lower part of the tooth. This contact surface 11 will consequently rub in the lower part of the pallet, and thus on a surface containing lubricant, which is favourable. FIG. 5b depicts the state of the pallet after cooperation with this second tooth 10 of the escapement wheel, corresponding to a tooth of which the cut-out is in the upper part. The effect of this contact is to displace the lubricant positioned on the pallet 20 and, at the end of this cooperation, the pallet exhibits a bottom zone 26 where there is a lack of lubricant, precisely on the zone where the friction with the second tooth has occurred. The lubricant has thus been displaced onto the remaining surface of the pallet 20, especially in the upper part.

Finally, it follows from this arrangement that the total contact surface 28 of the pallet 20 exhibits a surface area greater than that of each of the two distinct contact surfaces 11 with which it cooperates. This contact surface 28 of the pallet 20 corresponds substantially to the meeting of the aforementioned lower zone 26 and upper zone 24, which may nevertheless partially overlap. It may likewise extend slightly beyond the surface area corresponding to these two lower and upper zones. Each distinct contact surface 11 of the escapement wheel 1, more typically of the first horology component, cooperates by friction on a zone of the contact surface 28 of the pallet 20, more typically being a second horology component; this zone thus depicts a contact zone between the two horology components 1, 20 concerned. On the other hand, this contact zone exhibits a surface area strictly smaller than the surface area of the contact surface 28 of the second horology component, being the pallet 20 in the described embodiment. Each contact zone 24, 26 exhibits by definition a surface area that is substantially equal to that of the contact surface of the first horology component, which comes into contact precisely on this contact zone. The configuration of the distinct contact surfaces 11 of the first horology component, being the wheel 1 in this embodiment, is such that their aforementioned offset corresponds to an offset of their contact zones on the same second horology component. This offset of the contact zones is an offset on the same contact surface of the second horology component in the embodiment of the invention. In other words, said two contact surfaces of the horology component concerned, referred to as the first horology component, for example a wheel, are offset with respect to one another such as to offset their contact zones on the same second horology component. This offset is such that a first contact surface of a horology component concerned is adapted to displace a lubricant present on a second horology component, from a first contact zone with which it comes into contact towards a second contact zone of said second horology component with which a second distinct contact surface of the horology component concerned will subsequently come into contact, and therefore towards another zone of the contact surface of the second horology component. The contact surface of the second horology component forms the same continuous surface on which said two contact zones are disposed, in an offset manner, that is to say not totally overlapping.

This pattern is thus repeated with all the teeth of the escapement wheel, which alternates the two types of teeth described previously. The result is that each contact between a contact surface 11 of a tooth 10 and the pallet 20 takes place on a zone characterized by its good lubrication, which is advantageous. In addition, this movement may be repeated indefinitely, without loss of lubricant.

On the other hand, the invention also permits the implementation of a very simple method of manufacturing the escapement wheel and its teeth. It is, in fact, possible to manufacture a traditional escapement wheel, and then to add a cutting stage at the extremity of all or part of the teeth, such as to obtain the contact surfaces 11 and the recessed surfaces 12 described previously.

Figure 6:
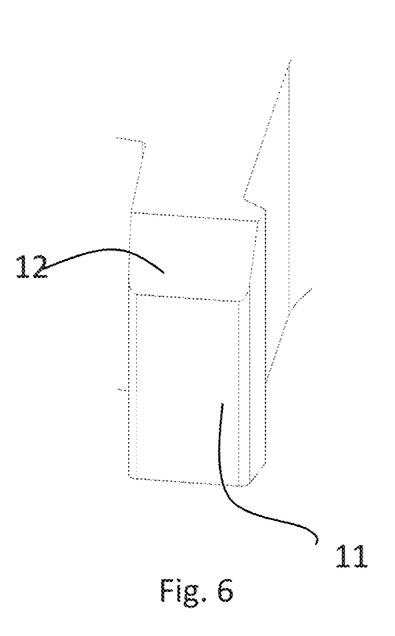
FIG. 6 depicts a tooth of an escapement wheel of an escapement device according to a variant of the first embodiment of the invention.

Naturally, the invention is not restricted to the described embodiment. For example, the contact surface 11 of a tooth may be formed by another cut-out, for example in the form of a bevel, as depicted in FIG. 6. This tooth 10 thus comprises an inclined flank forming an inclined recessed surface 12. As previously, two types of teeth may be alternated, respectively with a bevel in the upper part and in the lower part. It is possible to implement offsets between two contact surfaces in several directions, as can be appreciated, for example, from another example depicted in FIG. 7 and described below.

More typically, the wheel or the first horology component concerned is such that it comprises at least two distinct contact surfaces offset in relation to one another, such that a first contact surface is adapted to displace a lubricant present on a second horology component towards a surface with which the second contact surface will subsequently come into contact. The same quantity of lubricant is thus displaced at all times on the same contact surface of the second horology component, from one contact zone to another, for example from zone 24 to zone 26, each contact zone corresponding to a sub-section of the total contact surface of the second horology component, having a surface area strictly smaller than that of the total surface area of the contact surface 28 of the second horology component. Each contact zone is totally or partially offset in relation to any other contact zone of the same contact surface of the second horology component. In other words, two contact zones, corresponding to two zones of a second horology component with which two distinct contact surfaces of a first horology component come into contact, may be totally offset or partially offset, that is to say totally distinct or partially overlapping, but not totally overlapping.

Advantageously, the arrangement comprises two contact zones on said second horology component. More advantageously still, these two contact zones substantially exhibit a surface area and/or a height that are substantially equal to one another, and/or a surface area and/or a height that are substantially equal to that/those respectively of two distinct contact surfaces of the first horology component. As a variant, the arrangement comprises at least three contact zones on said second horology component, and the first horology component concerned likewise comprises at least three distinct contact surfaces corresponding to said three contact zones.

In addition, the two types of teeth or more typically types of contact surfaces are distributed in an alternating manner within the same horology component. Naturally, the distribution could be different while permitting an improvement in relation to the state of the art. It is possible, for example, to position two consecutive contact surfaces of the first type, followed by two consecutive contact surfaces of the second type, and so on. As a variant, any other distribution of the contact surfaces of the two types is possible. As a further variant, it is possible to imagine combining more than two types of teeth or, more typically, more than two types of contact surfaces, at all times with the same objective of offsetting the contact zones on a second horology component in order to vary the contact zones in a favourable manner in relation to the positioning of a lubricant.

Figure 7:
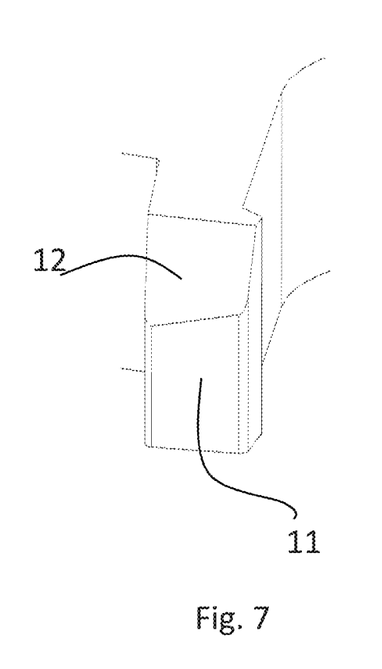
FIG. 7 depicts a tooth of an escapement wheel of an escapement device according to a second embodiment of the invention.

In this first embodiment, the outermost surface 6 of a tooth of an escapement wheel exhibits a constant cross-section in the orthoradial direction. FIG. 7 depicts the extremity of a tooth 10 according to a second embodiment. In this embodiment, the section is variable in the orthoradial direction. In particular, the tooth exhibits a recessed surface 12 obtained by a variable bevel. Thus, during contact of the contact surface 11 on a surface of a pallet, a complementary effect is observed, which not only induces a displacement of the lubricant out of the contact zone as the tooth passes, but also generates a lubricant concentration zone, in the form of a bead of lubricant. It should be noted that the cut-outs may be made according to the deep reactive ionic etching method (DRIE). This may necessitate an adjustment of the parameters in order to form the bevel.

Let us consider an escapement wheel comprising an alternation of teeth according to FIG. 7, with a positioning of the recessed surface 12 alternatively at the bottom and at the top of the tooth in the vertical axis Z.

Figure 8A:
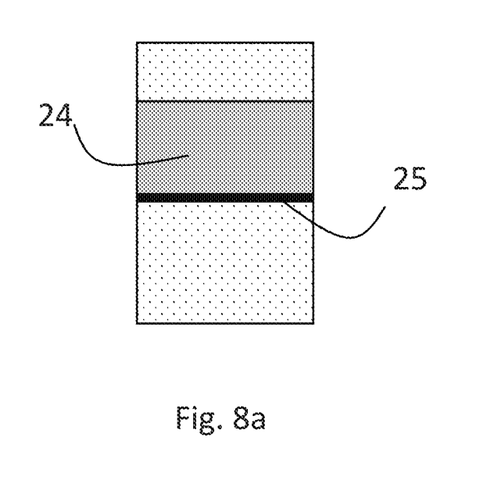
FIGS. 8a and 8b depict schematically the positioning of the lubricant on the contact surface of a pallet of a lever or a blocking member of the escapement device, after its cooperation respectively with a first tooth and then with a second tooth of the escapement wheel, according to the second embodiment of the invention.

FIG. 8a depicts the surface of the pallet after the passage of the first tooth comprising the recessed surface in the lower part. The effect of this cooperation is to displace the lubricant positioned on the pallet 20 outside the contact surface. At the end of this cooperation, the pallet exhibits an upper zone 24 where there is a lack of lubricant, precisely on the zone that has been subject to the friction of the contact surface 11 of the tooth 10. In addition, the presence of a bead 25 of lubricant can be seen on the lower zone where the presence of lubricant is concentrated.

Figure 8B:
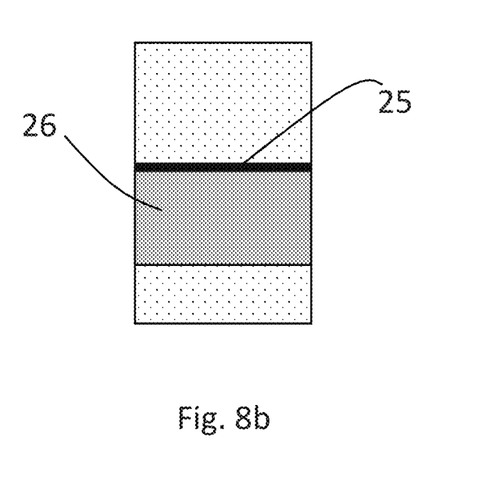

FIG. 8b depicts the state of the pallet after the cooperation with a second tooth 10 of the escapement wheel, corresponding to a tooth of which the cut-out is in the upper part of its extremity 6. As a result of this, the contact is provided by the contact surface 11 of the tooth 10, in the lower position of the tooth, thus on the well lubricated on the zone of the pallet. The effect of this contact is to displace the lubricant positioned on the pallet 20 and, at the end of this cooperation, the pallet exhibits a bottom zone 26 where there is a lack of lubricant, precisely on the zone where the friction with the second tooth has occurred. As previously, the presence of a bead 25 of lubricant can be seen on the upper zone where the presence of lubricant is concentrated.

Finally, as has been observed previously, two distinct contact surfaces of two distinct teeth are offset with respect to one another such as to cooperate at two separate points in time with the same second horology component, and such that, during the cooperation of the second tooth, it is able to benefit from the good lubrication of the second component. This offset is produced in a vertical direction Z. In other words, two distinct contact surfaces of two distinct teeth are offset in relation to a horizontal plane.

Advantageously, the two distinct teeth possess similar geometries, modified in relation to one another according to a symmetry in relation to a median horizontal plane of the outermost surface 6 of a tooth.

The invention is specifically adapted to an escapement wheel for an escapement device, as previously seen. FIG. 1 illustrates a Swiss lever escapement, although this example is, of course, not restrictive and the invention may be adapted to any escapement wheel for any escapement device. In particular, the lever or the blocking member may be made as one and the same part, as in the case of a Swiss lever escapement. As a variant, the lever or the blocking member may also be produced as two distinct parts and may be made in particular from two parts engaging with one another, as disclosed in a third variant of a second embodiment of an escapement as disclosed in application WO20171090046. In this third variant, the escapement device comprises a first escapement wheel, a second escapement wheel and a blocking member, the second escapement wheel being interposed between the first escapement wheel and the blocking member, the second escapement wheel in particular cooperating by contact with the first escapement wheel on the one hand and with the blocking member on the other hand. The first escapement wheel, the second escapement wheel and the blocking member may be configured and arranged in such a way that, in the disengagement phase of the escapement device, an effort of the blocking member controlled by the oscillator is transmitted to the first escapement wheel by means of the second escapement wheel. The second escapement wheel may be a second pinion or may comprise a second pinion and a second wheel.

Furthermore, the invention remains applicable to any horology component that is subject to friction with at least one second horology component. It is adapted in particular to a horology component generating a drive for another horology component. The horology component may thus be a rack comprising aligned teeth. In all these cases, in which the horology component is a component comprising a plurality of teeth, the contact surfaces of at least two distinct teeth are offset with respect to one another relative to any horizontal plane. Advantageously, all the teeth of the toothed horology component are distributed as two types of teeth, or three types or more, and the contact surfaces of the different types of teeth are offset in relation to one another relative to any horizontal plane. Advantageously, the toothed component comprises two types of teeth, of which the respective contact surfaces are positioned to either side of the median horizontal plane of the horology component. Even more advantageously, the toothed component comprises two types of teeth, of which the respective contact surfaces are positioned symmetrically around the median horizontal plane of the horology component.

The invention also relates to a method of driving a horology movement comprising a cooperation by lubricated contact between a first horology component, especially a wheel, and a second horology component, characterized in that it comprises the following stages:
 first contact between a first contact surface of the first horology component and the second horology component, followed by
 second contact between a second contact surface offset in relation to the first contact surface of the first horology component or of the wheel and the second horology component,
the two contact surfaces of the first horology component being offset in such a way that the first contact surface is adapted to displace a lubricant present on the second horology component towards a surface with which the second contact surface subsequently comes into contact.

As mentioned previously, the invention relates to a horology component, designed to cooperate in a particular manner with another horology component, comprising at least two distinct contact surfaces offset in relation to one another, that is to say that these two contact surfaces are designed to engage frictionally or to bear against two offset contact zones, in other words not totally overlapping, of the same second horology component, and even more preferably of the same contact surface of the same second horology component. This construction permits the lubrication of the contact between two horology components to be managed advantageously, as previously disclosed.

The invention claimed is:
1. Horology component intended to cooperate via a lubricated contact with at least one second horology component within a horology movement,
 wherein the horology component comprises at least two distinct contact surfaces intended to cooperate with the same second horology component,
 wherein the two contact surfaces are offset with respect to one another so as to offset respective contact zones of the two contact surfaces on the same second component, so that a first contact surface is adapted to displace a lubricant present on the second horology component towards a surface with which the second contact surface will subsequently come into contact,
 wherein the at least two distinct contact surfaces each comprise an outermost surface forming a contact surface distinguished by a cut-out forming a recessed surface positioned differently in relation to the outermost surface on each of the at least two distinct contact surfaces, and
 wherein the horology component comprises at least one contact surface of which the outermost surface comprises a plane and rectangular recessed surface, substantially parallel to a plane contact surface, the outermost surface and the rectangular recessed surface being separated by a wall positioned in a plane perpendicular to the plane contact surface.

2. Assembly of two horology components of a horology movement, comprising a first horology component cooperating via a lubricated contact with a second horology component, wherein the first horology component comprises at least two distinct contact surfaces cooperating with the second horology component, wherein the two contact surfaces are offset with respect to one another so as to offset two respective contact zones of the two contact surfaces on the second component, so that a first contact surface of the first horology component is adapted to displace a lubricant present on the second horology component from the first contact zone, with which the first contact surface comes into contact, towards the second contact zone, offset in relation to the first contact zone, with which said second contact surface comes into contact, the two contact zones being positioned on the same contact surface of the second component, wherein the at least two distinct contact surfaces each comprise an outermost surface forming a contact surface distinguished by a cut-out forming a recessed surface positioned differently in relation to the outermost surface on each of the at least two distinct contact surfaces, and wherein the first horology component comprises at least one contact surface of which the outermost surface comprises a plane and rectangular recessed surface, substantially parallel to a plane contact surface, the outermost surface and the rectangular recessed surface being separated by a wall positioned in a plane perpendicular to the plane contact surface.

3. Wheel for a horology movement, intended to cooperate via a lubricated contact with at least one second horology component, wherein the wheel comprises at least two distinct teeth, each comprising at least one respective contact surface, the respective contact surfaces of the two distinct teeth being intended to cooperate with the same second horology component, wherein the respective contact surfaces of the two distinct teeth are offset with respect to one another so as to offset contact zones of the respective contact surfaces on the same second component, so that a first contact surface of a first tooth is adapted to displace a lubricant present on a second horology component towards a surface on which the second contact surface will subsequently come into contact with the second tooth, wherein the at least two distinct teeth each comprise an outermost surface forming a contact surface distinguished by a cut-out forming a recessed surface positioned differently in relation to the outermost surface on each of the two teeth, and wherein the wheel comprises at least one tooth of which the outermost surface comprises a plane and rectangular recessed surface, substantially parallel to a plane contact surface, the two contact surfaces being separated by a wall positioned in a horizontal plane perpendicular to the axis of rotation of the wheel.

4. Wheel for a horology movement according to claim 3, wherein the two distinct teeth are two consecutive teeth.

5. Wheel for a horology movement intended to cooperate via a lubricated contact with at least one second horology component, wherein the wheel comprises two types of teeth, each tooth of each type comprising at least one contact surface intended to cooperate with the same second horology component, wherein the respective contact surfaces of the two types of teeth being offset in relation to one another, and wherein the wheel comprises an alternation of a tooth of the first type with a tooth of the second type, so that a contact surface of a first tooth according to the first type is adapted to displace the lubricant present on a second horology component towards a surface with which the contact surface of a successive second tooth according to the second type will subsequently come into contact, and vice versa, wherein the at least two types of teeth each comprise an outermost surface forming a contact surface distinguished by a cut-out forming a recessed surface positioned differently in relation to the outermost surface on each of the at least two types of teeth, and wherein the wheel comprises at least one tooth of which the outermost surface comprises a plane and rectangular recessed surface, substantially parallel to a plane contact surface, the two contact surfaces being separated by a wall positioned in a horizontal plane perpendicular to the axis of rotation of the wheel.

6. Wheel for a horology movement according claim 3, wherein the two contact surfaces of two distinct teeth are offset with respect to one another according to a symmetry in relation to a median horizontal plane of the wheel perpendicular to an axis of rotation of the wheel.

7. Wheel for a horology movement according claim 3, wherein at least one selected from the group consisting of (i) the two contact surfaces of the two distinct teeth are offset by a translation in a vertical direction parallel to an axis of rotation of the wheel in relation to one another, (ii) the two contact surfaces of two distinct teeth are offset with respect to one another in relation to a horizontal plane perpendicular to the axis of rotation of the wheel, and (iii) the two offset contact surfaces of the two distinct teeth extend respectively from the lower and upper extremities of the outermost surface of the teeth.

8. Wheel for a horology movement intended to cooperate via a lubricated contact with at least one second horology component, wherein the wheel comprises at least two distinct teeth, each comprising at least one respective contact surface, the respective contact surfaces of the two distinct teeth being intended to cooperate with the same second horology component, wherein the respective contact surfaces of the two distinct teeth are offset with respect to one another so as to offset contact zones of the respective contact surfaces on the same second component, so that a first contact surface of a first tooth is adapted to displace a lubricant present on a second horology component towards a surface on which the second contact surface will subsequently come into contact with the second tooth, wherein the at least two distinct teeth each comprise an outermost surface forming a contact surface distinguished by a cut-out forming a recessed surface positioned differently in relation to the outermost surface on each of the two teeth, and wherein the wheel comprises at least one tooth of which the outermost surface comprises a bevelled recessed surface in relation to a contact surface, the two contact surfaces being delimited by a segment extending in an orthoradial direction or by a bevel extending in orthoradial and vertical directions parallel to an axis of rotation of the wheel in order to form a recessed surface.

9. Assembly for a horology movement comprising a wheel according to claim 3 and a second horology component, the wheel cooperating via a lubricated contact with the second horology component, the wheel comprising at least two distinct contact surfaces cooperating with the second horology component, wherein the two contact surfaces are offset with respect to one another so as to offset their two respective contact zones on the second component, that a first contact surface of the wheel is adapted to displace a lubricant present on the second horology component of the first contact zone, with which the first contact surface comes into contact, towards the second contact zone, offset in relation to the first contact zone, with which the second contact surface comes into contact, the two contact zones being positioned on the same contact surface of the second component.

10. Escapement device for a horology movement, wherein the escapement device comprises a wheel according to claim 3, wherein the wheel is an escapement wheel cooperating with an escapement lever.

11. Escapement device for a horology movement according to claim 10, wherein the escapement lever comprises two distinct parts.

12. Horology movement, wherein the horology movement comprises at least one wheel according to claim 3.

13. Timepiece, wherein the timepiece comprises at least one wheel according to claim 3.

14. Method of manufacturing a horology component according to claim 1, the horology component being intended to cooperate via a lubricated contact with at least one second horology component, the horology component comprising at least two contact surfaces intended to cooperate with a same second horology component, wherein the method of manufacturing comprises a stage of manufacturing said two contact surfaces in an offset manner in relation to one another so as to offset their contact zones on the same second component, so that a first contact surface is adapted to displace a lubricant present on a second horology component towards a surface with which the second contact surface will subsequently come into contact.

15. The method of manufacturing a horology component according to claim 14, wherein the stage of manufacturing the two contact surfaces in an offset manner comprises a cutting stage of an outermost surface of a tooth in order to form a contact surface and a recessed surface that are contiguous.

16. The method of manufacturing a horology component according to claim 15, wherein the cutting is by machining.

17. Wheel for a horology movement according claim 4, wherein the two contact surfaces of two distinct teeth are offset with respect to one another according to a symmetry in relation to a median horizontal plane of the wheel perpendicular to an axis of rotation of the wheel.

18. Escapement device for a horology movement, wherein the escapement device comprises an assembly for a horology movement according to claim 9, in which the wheel is an escapement wheel and the second horology component is an escapement lever.

* * * * *